No. 716,702. Patented Dec. 23, 1902.
R. W. GATES.
PENCIL SHARPENER.
(Application filed Apr. 23, 1902.)
(No Model.) 2 Sheets—Sheet 1.
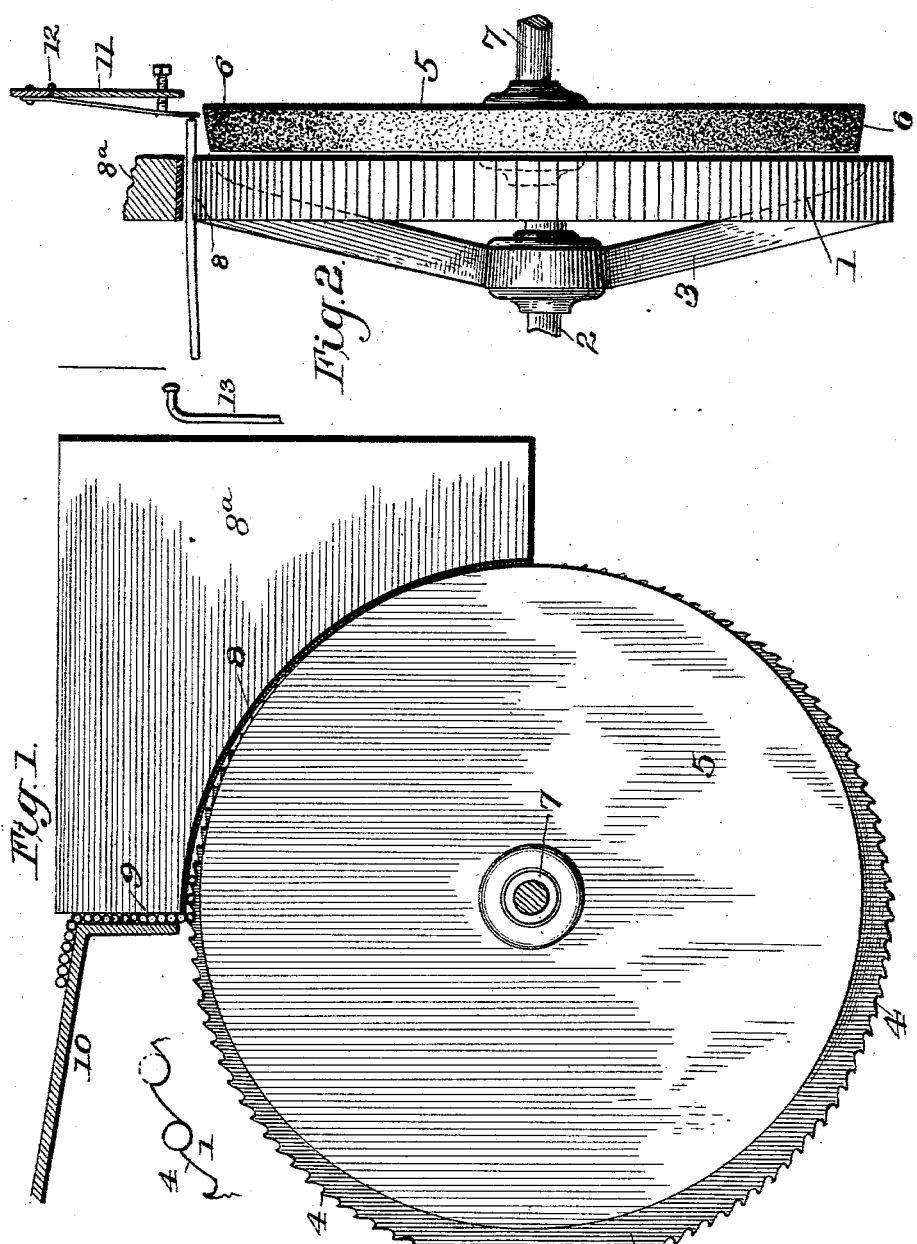
WITNESSES:
Jos. A. Ryan
Harrison B Brown
INVENTOR
Renfrew W. Gates.
BY Munn & Co.
ATTORNEYS

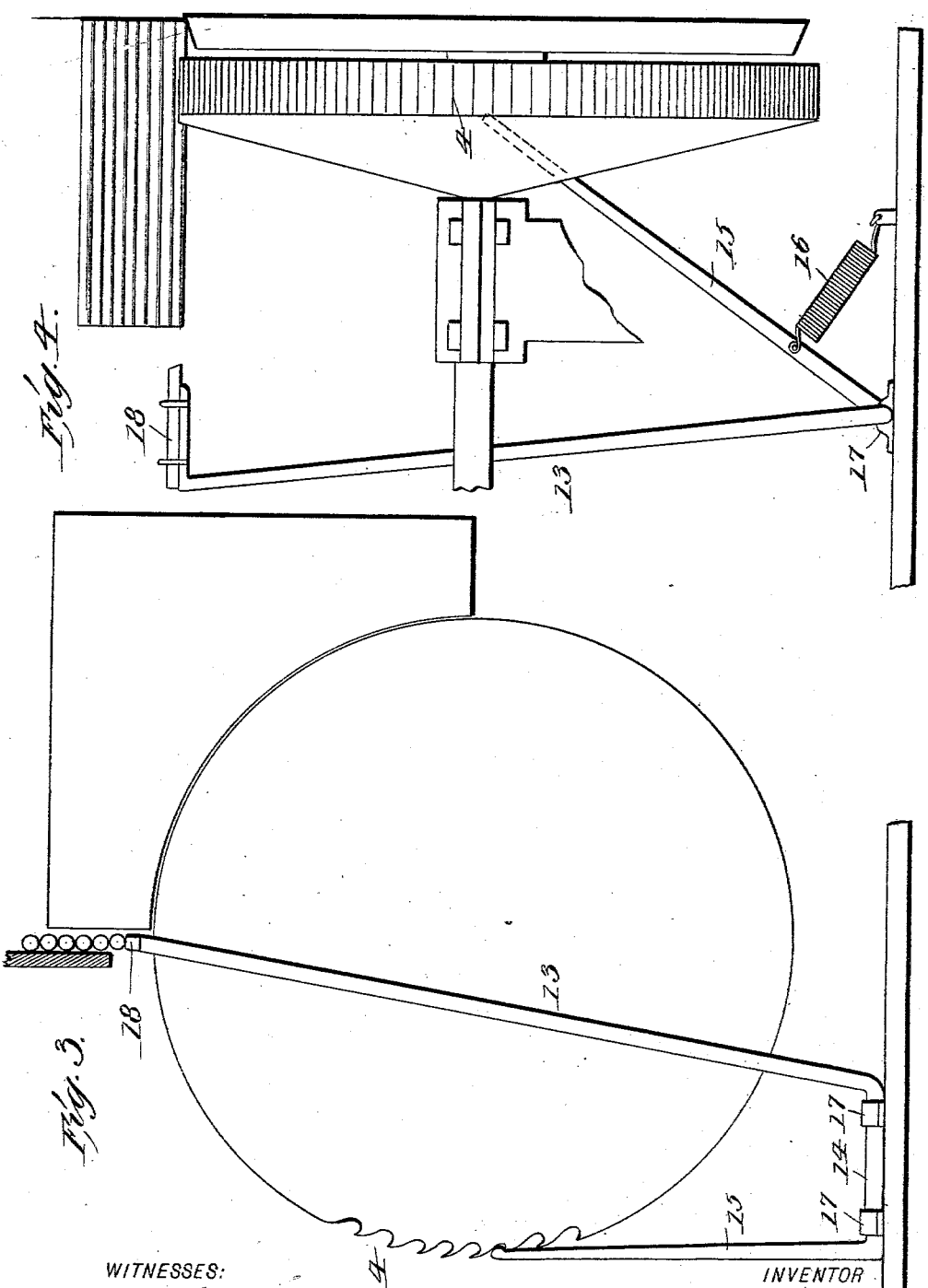

UNITED STATES PATENT OFFICE.

RENFREW W. GATES, OF CHATTANOOGA, TENNESSEE.

PENCIL-SHARPENER.

SPECIFICATION forming part of Letters Patent No. 716,702, dated December 23, 1902.

Application filed April 23, 1902. Serial No. 104,272. (No model.)

*To all whom it may concern:*

Be it known that I, RENFREW WIGHTMAN GATES, a resident of Chattanooga, in the county of Hamilton and State of Tennessee, have invented certain new and useful Improvements in Pencil-Sharpeners, of which the following is a specification.

The object of my invention is to provide a machine adapted to sharpen slate-pencils; and the invention consists, broadly stated, of peculiar mechanism whereby the blanks or unpointed pencils may be fed from a hopper to a special blank holding and sharpening means and the blank gradually sharpened to a gaged length of point, all as will be hereinafter fully described, and shown in the accompanying drawings, which form a part of this specification, and in which—

Figure 1 is a side elevation showing the relative position of the grinding and blank-supporting wheels, the chute for feeding the blanks, and concave for holding the blank; and Fig. 2 is an edge view of the blank-supporting and grinding wheels, also showing an adjustable gage to limit the length of the pencil-point. Fig. 3 is a detail view showing in side elevation the pencil-tapper device in operative position. Fig. 4 is an edge view further illustrating the tapper device.

It is obvious that some suitable frame must be provided for supporting the several features involving the essentials of my invention. Inasmuch, however, as no special frame is necessary and in view of the fact that any mechanic can readily construct a frame adapted to support the several features employed, I have not thought it necessary to encumber the drawings therewith.

I am aware that a machine adapted to automatically sharpen slate-pencils is not broadly new; also, that unpointed or blank pencils have been fed from a hopper to the machine, and I do not, therefore, claim that such a machine is original with me.

In order to enable others to make and use my machine, I will proceed to describe it, as follows:

In the drawings, 1 indicates a circular carrier-disk arranged at the end of and supported by an arbor 2, resting in suitable bearings. (Not shown.) For reasons as will appear further on the carrier 1 may be supported by inclined arms or spokes 3, as shown, or itself be of concave disk shape to accommodate the grinding means described further on. The outer face or periphery of the carrier 1 is provided with a series of transverse recesses 4 of a depth designed to be somewhat less than the cross-section of a pencil-blank.

5 indicates a reduced grinding-wheel rotating in a direction opposite to that of the carrier, having an outer periphery 6 inclining or converging toward the carrier or disk 1, as shown, and supported at the end of an arbor 7, which latter must rest in bearings, (not shown,) with its center offset to one side with relation to the arbor 2, as indicated in Fig. 1 of the drawings. In other words, the grinding-wheel 5 is eccentrically arranged in relation to the carrier or disk 1.

$8^a$ indicates a concave supported in the position shown, having a rubber face 8 extending from end to end of the concave.

9 indicates a chute leading from the blank-supporting disk or carrier 1 to an incline 10.

11 indicates a gage hinged at its upper end 12 to the framing of the machine or other suitable position covering the chute 9, as shown in dotted lines in Fig. 1 of the drawings. The lower end of the gage is provided with screw adjustment, as shown.

13 indicates a striker operated by suitable means, such as a cam or other obvious devices, connecting working parts of the machine, designed to tap the blank on one end, forcing the opposite end against the gage 11.

While I do not desire to limit myself to any special means for supporting and operating the striker or tapping device 3, as showing one means I refer to Figs. 3 and 4 of my drawings. With the construction shown by said figures the upper end of the tapper-arm 13 is arranged in position to strike the projecting end of the lowermost pencil. The lower end of the said arm 13 is bent horizontally at 14 (see Fig. 3) and thence at an angle, forming a lever 15. (See Fig. 4.) The free end of said lever 15 rests in engagement with the toothed periphery of the carrier 1, formed by the recesses 4, of which only a few of them are shown by Fig. 3. The free end of the lever 15 is held in working position against the edge or teeth of the carrier 1 by a spring 16. The horizontal member 14 of the tapper is supported in bearings 17, as shown. Now it is apparent that as the carrier-wheel 1 rotates the free end of the lever 15 will be given motion, and thereby the upper end of the tapper 13 operated, with effect to strike and push forward the lowermost pencil into position for proper sharpening. The tapper-arm 13 may be provided with any suitable head 18, adapted to strike the end of only one pencil, the lowermost, as hereinbefore described.

In operative position the space between the rubber face 8 of the concave 8ª and the grinder 5 diminishes from the chute 9 to the lower or other end of the concave.

With the parts arranged as shown and supported as may be desired, upon power being applied to the arbors 2 and 7, with the speed of the latter much faster than that of the former, blank pencils may be sharpened, as I will now describe.

In operation blanks sliding down the chute 9 will drop into the recesses 4 of the disk or carrier 1. Now, as before stated, the recesses being of less depth than a cross-section of the blank, as the carrier moves forward the blanks will, by the resisting action of the rubber face or lining 8 of the concave 8ª, be forced to rotate in a direction opposite to the travel of the carrier 1, and such motion of the blank will be continued until it is sharpened and leaves the concave. I have heretofore stated that the grinding-wheel 5 is eccentrically arranged to the carrier 1, with the face or periphery 6 of the grinder 5 inclining inwardly, as shown, and it is apparent that the end of the blank will first engage the grinder. Now, since the space between the concave and grinder gradually lessens, it is obvious that the blank will, owing to the difference in speed of the carrier 1 and grinder 5—i. e, the former having a slow motion and the latter speeded up—by the inclined abrading-surface 6 be uniformly ground away from the end of the blank and inwardly providing it with a tapered and sharp point.

Having thus fully described my invention, what I claim as new, and desire to secure by Letters Patent, is—

1. The combination in a machine for sharpening pencils of a slowly-rotating blank-carrier, means for gradually grinding away the blank to a tapered point as stated, a fixed concave having a resisting face as specified and a chute leading the blanks to the carrier, substantially as described.

2. The combination with a pencil-sharpener of a circular carrier having its periphery recessed as shown, the recesses being of less depth than a cross-section of the blank pencil, a grinding-wheel with periphery inclining to the carrier, a concave faced with resisting material and spaced from the grinder as specified, a chute leading to the carrier, means such as a gage to limit end movement of the blank and a tapper operating to force the blanks in contact with the gage, substantially as described.

3. The combination in a machine for sharpening pencils of a slowly-rotating blank-carrier, a grinding-wheel and a concave faced with resisting material spaced from the grinder as specified whereby the blanks carried by the carrier are rotated in a direction opposite to motion thereof and at the same time provide resistance to end thrust exerted on the blank by the bevel periphery of the grinder, substantially as described.

4. The combination in a machine for sharpening pencils, of a grinding-wheel, a slowly-rotating blank-carrier having a series of peripheral recesses of diameter conforming to the blank to be pointed but of less depth than a cross-section thereof and a concave adapted to hold the blanks in the said peripheral recesses with resistance to side thrust exerted by the grinding-wheel, substantially as described.

5. The combination with a machine for sharpening pencils of a circular blank-carrier, the said carrier being recessed as specified and of less width than the length of the blank.

RENFREW W. GATES.

Witnesses:
J. A. McCARDELL,
P. M. GOODMAN.